United States Patent
O'Rourke

(10) Patent No.: US 6,226,410 B1
(45) Date of Patent: *May 1, 2001

(54) METHOD AND APPARATUS FOR PROVIDING IMAGE AND VIDEO CODING WITH ITERATIVE POST-PROCESSING USING TRANSMITTED STEP SIZE INFORMATION

(75) Inventor: Thomas P. O'Rourke, Portland, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/885,123

(22) Filed: Jun. 30, 1997

(51) Int. Cl.$^7$ ........................................ G06K 9/36
(52) U.S. Cl. ................................................ 382/232
(58) Field of Search ..................... 382/232, 233, 382/248, 250, 251, 236; 395/800, 376; 364/231.8; 348/401, 415, 390, 407; 341/236

(56) References Cited

U.S. PATENT DOCUMENTS

| 4,862,173 | * | 8/1989 | Nishitani | 341/200 |
| 5,491,515 | * | 2/1996 | Suzuki | 348/401 |
| 5,576,765 | * | 11/1996 | Cheney et al. | 348/407 |

(List continued on next page.)

OTHER PUBLICATIONS

Zakhor, "Iterative Procedures for Reduction of Blocking Effects in Transform Image Coding", IEEE, vol. 2, No. 1, Mar. 1992.*

"Improved Image Decompression for Reduced Transform Coding Artifacts", Thomas P. O'Rourke and Robert L. Stevenson, IEEE Transactions on Circuits and Systems for Video Technology, vol. 5, No .6, Dec. 1995, pp 490–499.

"Reduction of Coding Artifacts in Transform Image Coding", Robert L. Stevenson, IEEE, 1993, pp v401–404.

"Iterative Procedures for Reduction of Blocking Effects in Transform Image Coding", Avideh Zakhor, IEEE Transactions on Circuits and Systems for Video Technology, vol. 2, No. 1, Mar. 1992, pp 91–95.

"Comments on Iterative Procedures for Reduction of Blocking Effects in Transform Image Coding", Stanley J. Reeves and Steven L. Eddins, IEEE Transactions on Circuits and Systems for Video Technology, vol. 3, No. 6, Dec. 1993, pp 439–440.

"Regularized Reconstruction to Reduce Blocking Artifacts of Block Discrete Cosine Transform Compressed Images", Yongyi Yang, Nikolas P. Galatsanos and Aggelos K. Katsaggelos, IEEE Transactions on Circuits and Systems for Video Technology, vol. 3, No. 6, Dec. 1993, pp 421–432.

"Improved Definition Image Expansion", Richard R. Schultz and Robert L. Stevenson, Laboratory for Image and Signal Analysis Department of Electrical Engineering University of Notre Dame, IEEE 1992, pp III–173–III–176.

Primary Examiner—Jose L. Couso
Assistant Examiner—Anh Hong-Do
(74) Attorney, Agent, or Firm—Blakely, Sokoloff, Taylor & Zafman LLP

(57) ABSTRACT

The present invention is an apparatus that includes a processor and a memory coupled to the processor. The memory contains instruction executed by the processor to transform an image to provide a transformed image, quantize the transformed image to provide a quantized image, and process the quantized image to iteratively generate one or more step sizes. The processor is adapted to transmit the one or more step sizes to an image decoder.

16 Claims, 10 Drawing Sheets

U.S. PATENT DOCUMENTS 5,610,657 * 3/1997 Zhang .................................. 348/415
5,684,534 * 11/1997 Harney et al. ....................... 348/390
5,754,700 * 5/1998 Kuzma ................................ 382/236

* cited by examiner

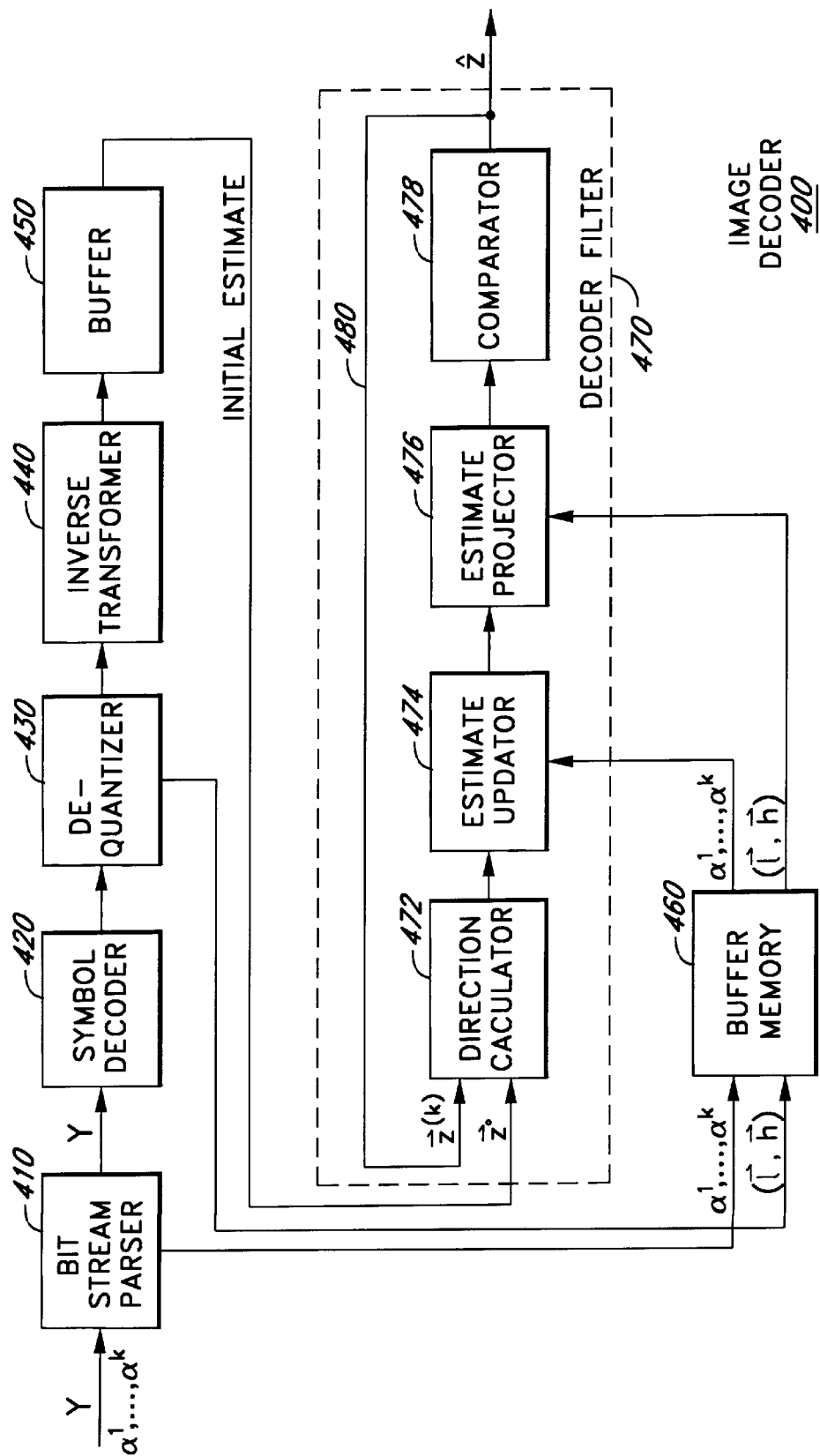

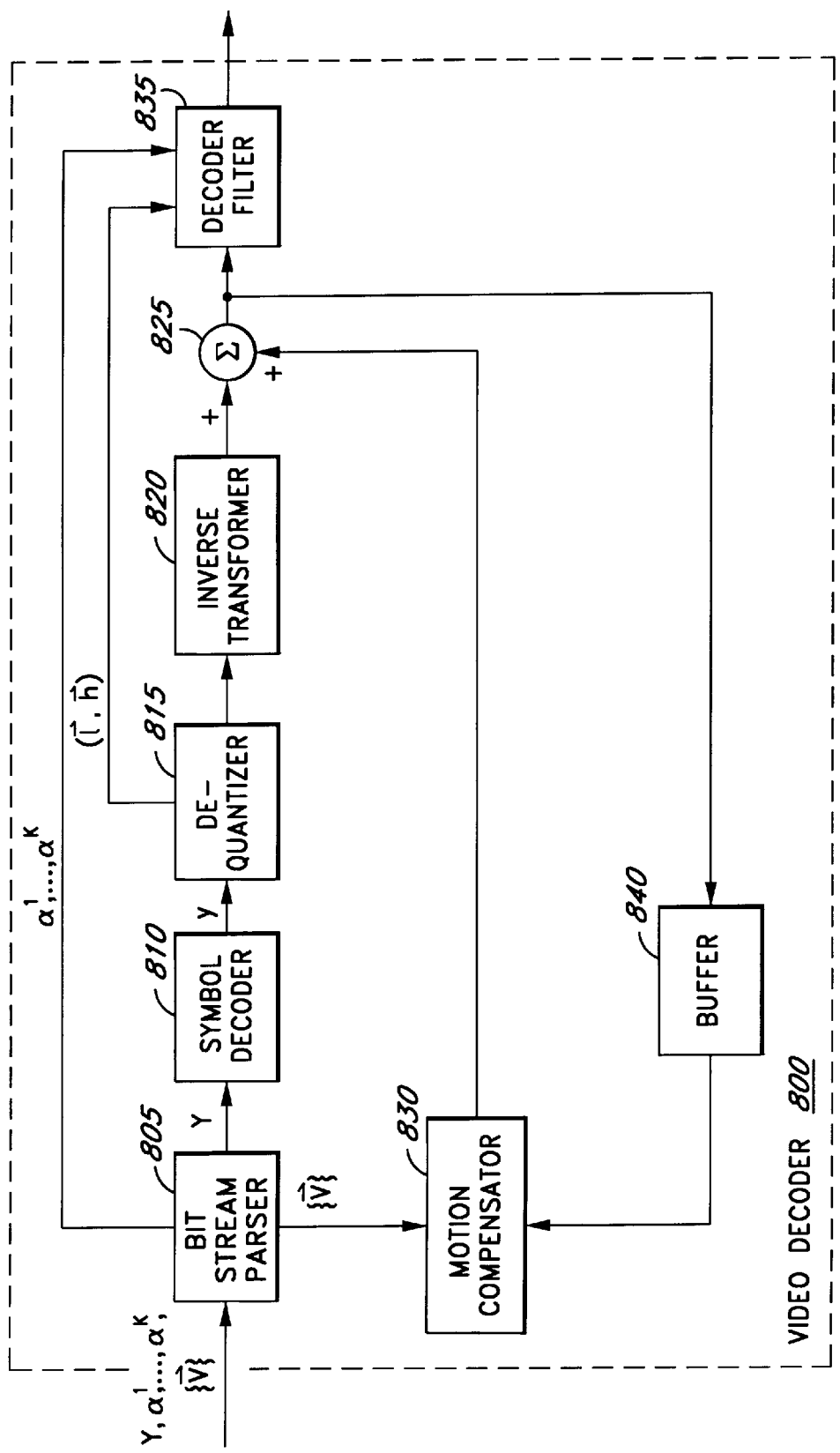

METHOD AND APPARATUS FOR PROVIDING IMAGE AND VIDEO CODING WITH ITERATIVE POST-PROCESSING USING TRANSMITTED STEP SIZE INFORMATION

BACKGROUND OF THE INVENTION

1. Field of the Invention

The present invention relates to the field of image and video compression. More particularly, the present invention relates to a method and apparatus for improving the quality of compressed image and video signals while significantly reducing the complexity of post-processing in the image or video decoder.

2. Background Information

With the continuing growth of digital image and video technology in areas such as video telephony, where bandwidth is a scarce commodity, the demand for providing image compression while maintaining image quality is a compelling need. A digital image on a standard 640×480 pixel display screen requires an enormous amount of data. For example, assuming one byte per pixel for a gray scale digital image, the 640×480 pixel digital image occupies about 307,200 bytes of storage. A color digital image requires three bytes per pixel or about 921,600 bytes of storage. Today, display screens capable of displaying over 2000×2000 pixel images are readily available and require about twelve million bytes of data for a single color image. Even more demanding are motion videos which require even more data. The amount of data required to generate such images makes the storage, processing, and transmission of the data difficult. As a result, image compression, which reduces the amount of data required to represent a digital image, has evolved as an integral part in the storage and transmission of digital images.

In particular, source coding of image data has been a very active area of research for many years. The goal is to reduce the number of bits needed to represent an image while making as few perceptible changes to the image as possible. Typically, image and video compression algorithms employ a quantization stage. The effect of the quantization stage is to add quantization noise to the reconstructed image or video. Many algorithms have been developed which can successfully compress a gray scale image to approximately 0.8 bits per pixel ("bpp") with almost no perceptible effects. A problem arises, however, when these compression techniques are pushed beyond this rate. In implementing higher compression ratios (<0.4 bpp for gray scale), typical algorithms generate artifacts which severely degrade the perceived (visual) quality of the image. The type of artifacts generated is dependent on the compression technique and on the particular image.

Recently, iterative techniques have been described for reducing the quantization noise effects associated with image and video encoding schemes that perform quantization. One approach is described by O'ROURKE & STEVENSON in *Improved Image Decompression for Reduced Transform Coding Artifacts*, IEEE TRANSACTIONS ON CIRCUIS AND SYSTEMS FOR VIDEO TECHNOLOGY, Vol. 5, Dec. 1995,490–99. This technique requires modification of an image decoder. Namely, the image decoder first obtains an initial estimate by decompressing the image. The initial estimate is applied to an iterative post processing filter which improves the initial estimate by successive iterations until the difference between successive estimates falls below a predetermined threshold or a maximum number of iterations is reached. Within each iteration of the post-processing filter, a step size is calculated in order to converge on an estimate. Although the iterative technique described in O'ROURKE & STEVENSON greatly reduces the noticeable artifacts which exist using standard decompression techniques, it has certain disadvantages associated with it.

First, the step size calculation apparatus for implementing such a technique is expensive and complex. Second, the entire image must be applied to the iterative post-processing filter because the step size for a particular iteration is dependent on the intermediate filtered image from the previous iteration. As such, the decoder will not be able to iteratively post-process a subsection of the image. Thirdly, since the entire image is applied to the iterative post-processing filter, the efficient exploitation of data cache locality in a computer based implementation will not be achieved.

Accordingly, there is need in the art for an apparatus and method of improving the quality of compressed image and video signals while reducing the complexity and cost of post-processing in the image or video decoder.

SUMMARY OF THE INVENTION

The present invention is an apparatus that includes a processor and a memory coupled to the processor. The memory contains instruction executed by the processor to transform an image to provide a transformed image, quantize the transformed image to provide a quantized image, and process the quantized image to iteratively generate one or more step sizes. The processor is adapted to transmit the one or more step sizes to an image decoder.

BRIEF DESCRIPTION OF THE DRAWINGS

The features and advantages of the present invention will become apparent from the following detailed description of the present invention in which:

FIG. 4A illustrates an exemplary embodiment of an image decoder 400 that is implemented in the present invention.

FIG. 8 is a block diagram illustrating an exemplary video decoder utilizing the present invention.

DESCRIPTION OF THE PREFERRED EMBODIMENT

The present invention relates to a method and apparatus for improving the quality of compressed image and video signals while significantly reducing the cost of post-processing in the image or video decoder. Iterative post-processing dramatically improves the visual quality of compressed image and video signals as viewed after decompression.

In particular, the present invention is directed to the encoding of image signals and the decoding of such encoded image signals. In the image encoder, an image is encoded to generate an encoded image and the encoded image is decoded to generate a decoded image in order to generate a sequence of step sizes. An iterative post-processing filter is applied to the decoded image to generate a filtered image and a sequence of step sizes. The encoded image and the sequence of step sizes are transmitted to the image decoder.

The image decoder receives the encoded image and the sequence of step sizes. The image decoder decodes the encoded image to generate a decoded image. A decoder filter (also known as a modified iterative post-processing filter) is applied to the decoded image to generate a filtered image. The decoder filter in the decoder uses the received sequence of step sizes instead of calculating those step sizes. A similar process is performed in a video encoder and a video decoder. In the description that follows, a sequence of step sizes is defined as one or more step sizes.

Figure 1:
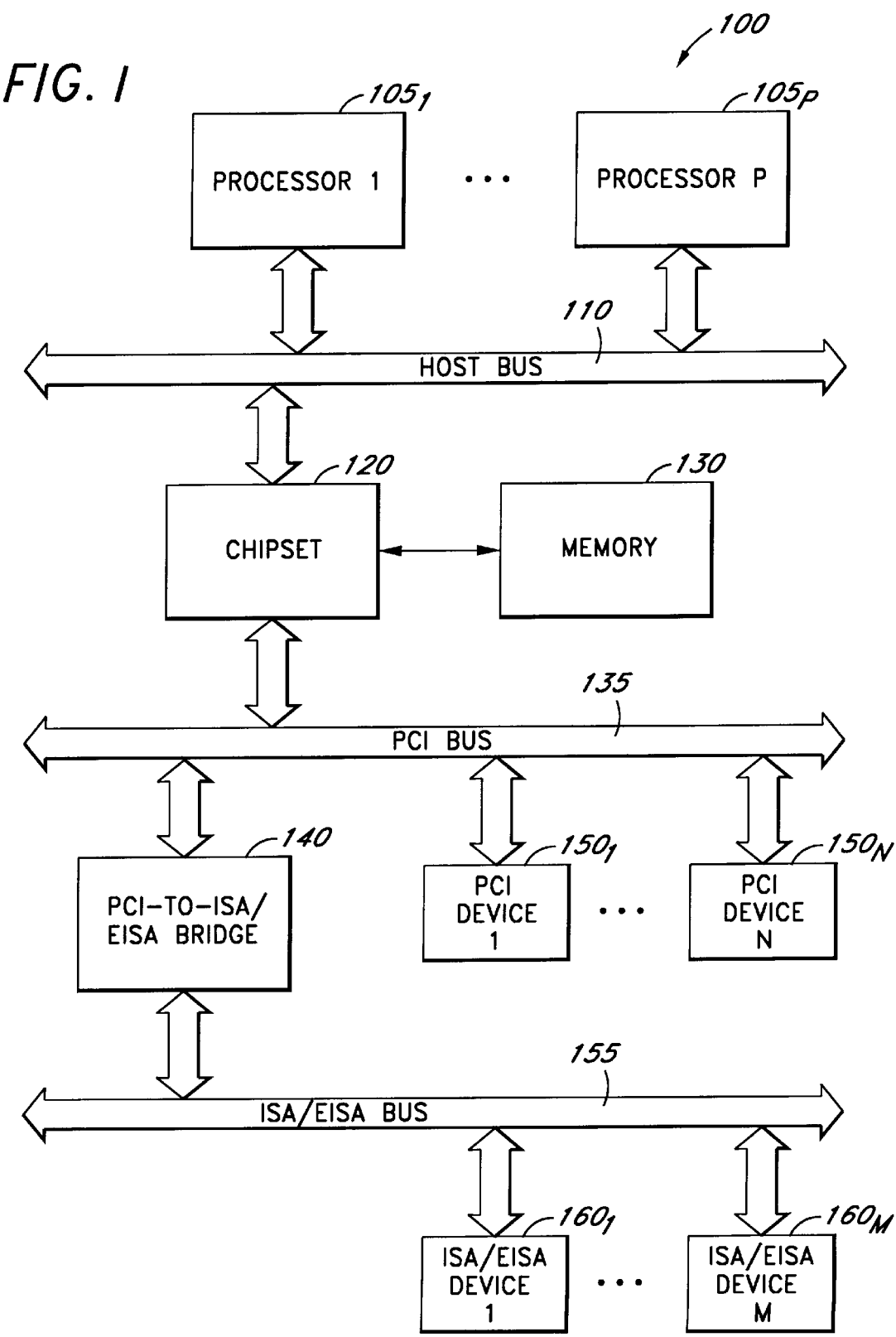
FIG. 1 illustrates an exemplary embodiment of a computer system suitable for use with the present invention.

Referring to FIG. 1, an illustrative embodiment of a computer system suitable for use with the present invention is shown. The computer system 100 comprises a plurality of processors $105_1$–$105_P$ ("P" being a positive whole number) and a main memory element 130 (e.g., dynamic random access memory "DRAM", static random access memory "SRAM". etc.) coupled together by a chipset 120. However, it is contemplated that the computer system 100 may include only one processor. The chipset 120 (hereinafter referred to as a "bridge") operates as an interface between a host bus 110 and a peripheral bus 135.

Processors $105_1$–$105_P$ may be any type of microprocessor such as the Pentium® or Pentium® Pro microprocessor manufactured by Intel Corporation of Santa Clara, Calif. Bridge 120 typically includes a cache DRAM controller ("CDC"), a Peripheral Component Interconnect ("PCI") bus controller, and a data path unit ("DPU").

The host bus 110 is a bus that can support transactions to a number of connected processors. Host bus 110 may be referred to as a parallel bus or multiprocessor bus because it supports parallel operations and multiple processors. It is contemplated that host bus 110 operates in a pipelined manner to increase efficiency. However, these features are not construed to limit the teachings of the present invention. The present invention can be utilized if there is only one processor connected to the host bus 110.

The peripheral bus 135 provides a communication path between the processors $105_1$–$105_P$ or main memory element 130 and a plurality of peripheral devices $150_1$–$150_N$ ("N" being a positive whole number). In particular, the peripheral devices may include a secondary storage controller (e.g., a hard disk controller) coupled to a hard disk and a video controller coupled to a monitor (not shown). The peripheral bus 135 may include a PCI bus or any other type of bus architecture.

The expansion bus 155 provides a communication path between the peripheral bus 135 and a plurality of expansion peripheral devices $160_1$–$160_M$ ("M" being a positive whole number). The expansion bus 155 may include an Industry Standard Architecture ("ISA") bus or an Extended Industry Standard Architecture ("EISA") bus. However, it is apparent to one skilled in the art that the architecture of the computer system 100 of FIG. 1 is not critical in practicing the present invention.

1. Still Image Implementation

Figure 2A:
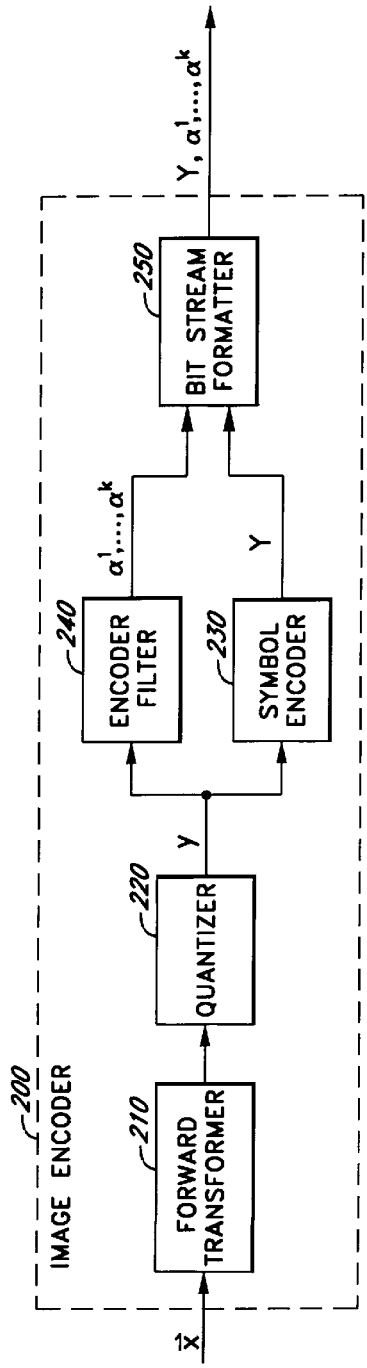
FIG. 2A illustrates an exemplary embodiment of an image encoder that is implemented in the present invention.

FIG. 2A illustrates an exemplary embodiment of an image encoder 200 that is implemented in the present invention. Referring to FIG. 2A, the image encoder 200 applies an original image $\bar{x}$ to a forward transformer 210 which produces transform coefficients $H\bar{x}$. By way of example, if the forward transformer 210 performs a block transform, then the forward transformer 210 breaks up the original image $\bar{x}$ into a plurality of subimages as part of the operation of the transform. In one embodiment, the forward transformer 210 performs a slant transform. However, it is apparent to one of ordinary skill in the art that many other transformation techniques, such as a Haar transformation technique or a Discrete Cosine Transform ("DCT") technique, may be used in lieu thereof. The transformed image is applied to a quantizer 220. Quantization partitions the transform coefficient space and maps all points in a partition cell to a representative reconstruction point, usually taken as the centroid of the cell. The output of the quantizer 220 is represented by y, which can be written as $$y = Q[H\bar{x}]. \tag{1}$$

The quantized image y is applied to a symbol encoder 230 and an encoder filter 240. The symbol encoder 230 further compresses the image. Typically, the symbol encoder 230 provides Huffman and/or run-length coding. The output of the symbol encoder 230 is the compressed image, represented by Y. The encoder filter 240 decodes the image and applies an iterative post-processing filter to the decoded image to generate a sequence of step sizes $\alpha^0, \ldots, \alpha^k$. The encoder filter 240 then applies the sequence of step sizes, $\alpha^0, \ldots, \alpha^k$ to a bit stream formatter 250. Similarly, the symbol encoder 230 applies the compressed image, Y, directly to the bit stream formatter 250. The bit stream formatter 250 formats the data according to a predetermined protocol for storage and/or transmission to an image decoder.

Figure 2B:
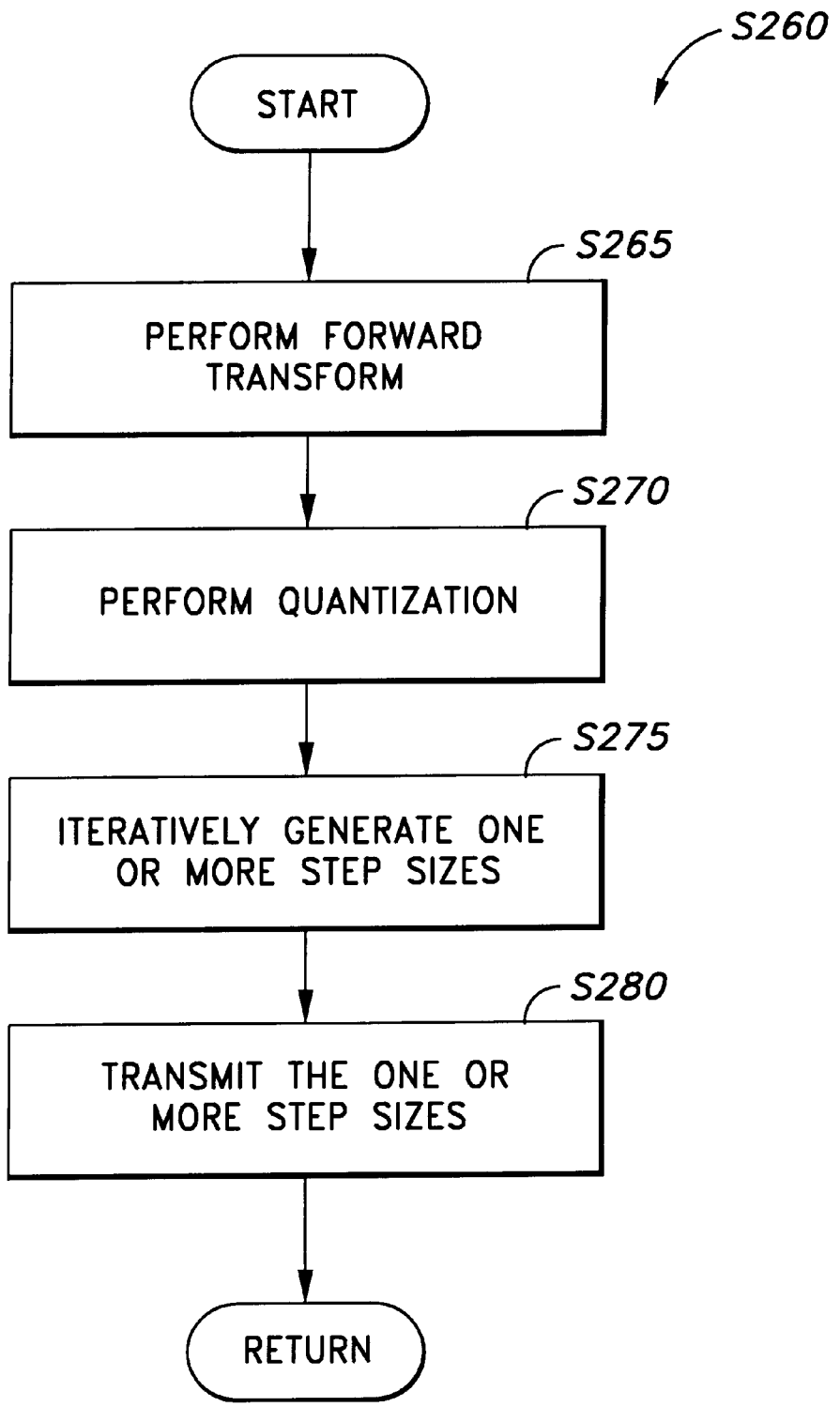
FIG. 2B is a flow diagram illustrating a process for implementing the image encoder of FIG. 2A using a computer system.

FIG. 2B is a flow diagram illustrating a process S260 for implementing the image encoder 200 of FIG. 2A using a computer system such as, for example, the computer system 100 of FIG. 1. In one embodiment, the process S260 is implemented using one or more instructions located in memory (e.g., memory 130 of FIG. 1) and executed by a processor (e.g., processor $105_1$). Referring to FIG. 2B, the process S260 commences with block S265 where a forward transform is performed, and at block S270, the transformed image is quantized. At block S275, one or more step sizes are generated iteratively. At block S280, the one or more step sizes are transmitted with the compressed image for later processing by an image decoder.

The decompression techniques implemented in the present invention will now be described in detail. To decompress the compressed image representation, a maximum a posteriori ("MAP") technique is used. The decompressed full resolution image is represented by z. As described in O'ROURKE & STEVENSON, for MAP estimation, the decompressed image estimate $\hat{z}$ is given by $$\hat{z} = \arg\min_{z \in Z} \{-\log \Pr(z)\}, \tag{2}$$

where Z is the set of images which compress to y and Pr(z) is the a priori probability of a particular image z. Pr(z) depends on the image model. For a Huber Markov Random Field ("HMRF") image model, an objective function can be expressed as $$F(z) = \sum_{1 \le m \le M} \sum_{1 \le n \le N} \sum_{k,l \in N_{m,n}} \rho T(z_{m,n} - z_{k,l}). \qquad (3)$$

$N_{m,n}$ represents the neighborhood of pixels around the pixel located at (m,n). In a preferred embodiment, the neighborhood includes the four nearest neighbors of the pixel located at (m,n). However, in another embodiment, the neighborhood includes the eight nearest neighbors of the pixel located at (m, n). The image height is M while the image width is N. The function $\rho T(.)$ is given by $$\rho T(u) = \begin{cases} u^2 & |u| \le T, \\ T^2 + 2T(|u| - T), & |u| > T. \end{cases} \qquad (4)$$

The HMRF image model assumes that the image should be smooth but uses the function $\rho T(.)$ to allow some discontinuities. The parameter T controls the amount of discontinuity which is allowed. A larger value of T will result in a smoother image estimate. In one embodiment, the parameter T is chosen in the range 1 to 3. Based on the HMRF image model, the MAP estimation $\hat{z}$ is the image estimate which minimizes the objective function while still being within the constraint space Z. The image estimate can be written as $$\hat{z} = \arg\min_{z \in Z} \sum_{1 \le m \le M} \sum_{1 \le n \le N} \sum_{k,l \in N_{m,n}} \rho T(z_{m,n} - z_{k,l}). \qquad (5)$$

As a result of the choice of image model, this results in a convex constrained optimization which can be solved using iterative techniques.

Figure 3A:
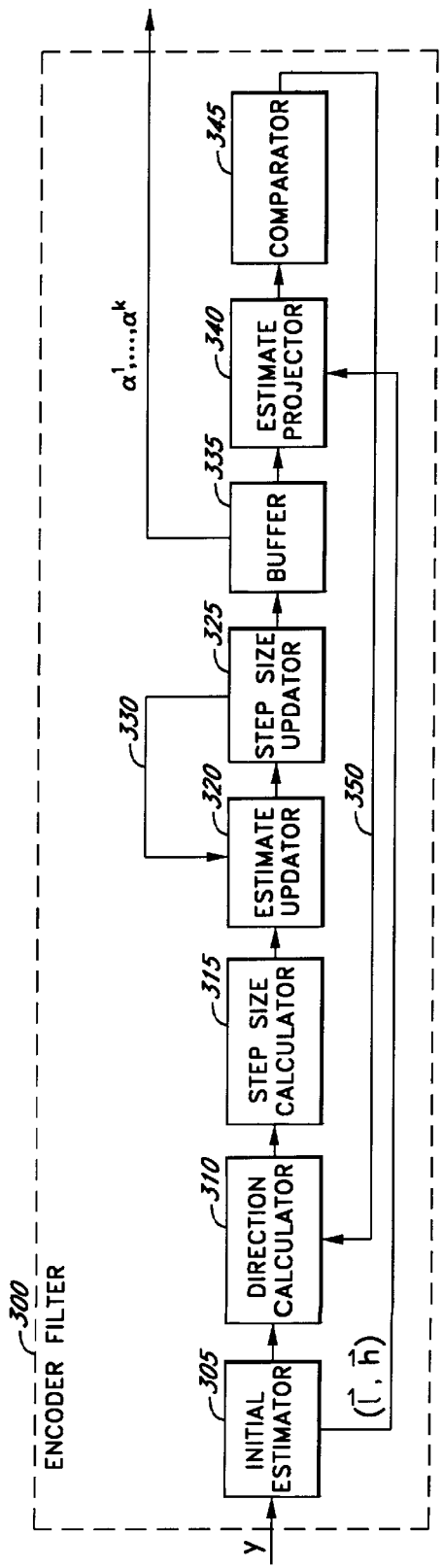
FIG. 3A is a block diagram illustrating one embodiment of the encoder filter used to calculate a sequence of step sizes.
Figure 3B:
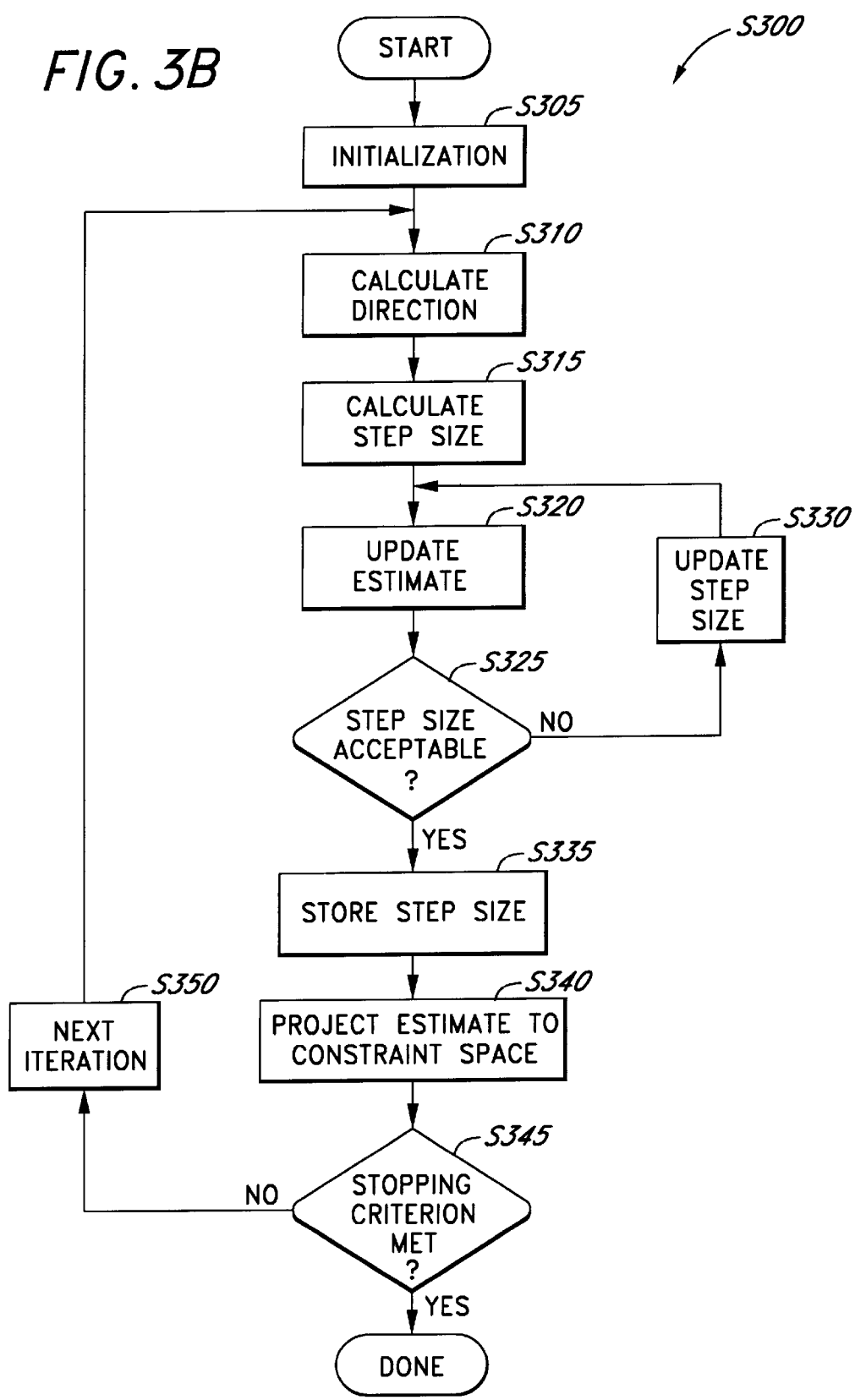
FIG. 3B is a flow diagram illustrating an exemplary iterative approach used in calculating a sequence of step sizes using the computer system of FIG. 1.

FIG. 3A is a block diagram illustrating one embodiment of the encoder filter 300 used to calculate a sequence of step sizes. The encoder filter 300 may be used in place of the encoder filter 240 of FIG. 2A. Each block in FIG. 3A represents a circuit. FIG. 3B is a flow diagram illustrating an exemplary iterative approach used in calculating a sequence of step sizes $\alpha^0, \ldots, \alpha^k$ using a computer system such as the computer system 100 of FIG. 1 (using one or more processors). In one embodiment, the process S300 is implemented using one or more instructions located in memory (e.g., memory 130 of FIG. 1) and executed by a processor (e.g., processor $105_1$). An initial estimate $\overline{z}^{(0)}$ of the original image $\overline{x}$ is improved through successive iterations until the difference between $\overline{z}^{(k)}$ and $\overline{z}^{(k+1)}$ is below a given threshold $\epsilon$ or until the number of iterations has reached a maximum, $k_{max}$. The rate of convergence of the iteration is affected by the choice of the initial estimate. A better initial estimate will result in faster convergence.

The computer system 100 of FIG. 1 (using one or more processors $105_1$–$105_P$) or the encoder filter 300 of FIG. 3A may be used to calculate the sequence of step sizes $\alpha^0, \ldots, \alpha^k$. Therefore, each step of the process S300 of FIG. 3B will also be discussed with reference to the encoder filter 300. Referring to FIGS. 3A and 3B, the process S350 begins at initialization (Step S305). During initialization, k is set to zero and the initial estimate is formed as expressed below:

$$\overline{z}^{(0)} = H^{-1}Q^{-1}[y]. \qquad (6)$$

That is, the initial estimate is determined by applying y to a de-quantizer $Q^{-1}$ and an inverse transformer $H^{-1}$ (i.e., the inverse of blocks 210 and 220 of FIG. 2A). Moreover, during initialization, the quantization boundaries $(\bar{l}, \bar{h})$ for all of the transform coefficients are stored in a temporary buffer (e.g., buffer 335) or transmitted directly to an estimate projector 340 (Step S340). The quantization boundaries $(\bar{l}, \bar{h})$ for the transform coefficients define the constraint space Z. In the encoder filter 300, these operations are performed by an initial estimator 305. Given the estimate at the kth iteration, $\overline{z}^{(k)}$, in the preferred method, the gradient projection method is used to find the estimate at the next iteration, $\overline{z}^{(k+1)}$.

At Step S310, the gradient of the objective function F(z) is used to find the steepest direction $\overline{g}^{(k)}$ toward the minimum, as provided by the following expression:

$$\overline{g}^{(k)} = \sum_{c \in C} \rho'T(d_c^t z^{(k)}) d_c^t, \qquad (7)$$

where $\rho'T(u)$ is the first derivative of the Huber minimax function and $$\{d_c^t z\}_{c \in C} = \{z_{m,n} - z_{k,l}\}_{k,l \in N_{m,n}, 1 \le m \le M, 1 \le n \le N} \cdot d_c^t z$$

is an operator that performs the difference between neighboring pixels and C is the set of neighboring pixel pairs. This is performed by the direction calculator 310 of FIG. 3A. At Step S315, the step size $\alpha^{(k)}$ is calculated using the equation $$\alpha^{(k)} = \frac{\overline{g}^{(k)t} \overline{g}^{(k)}}{\overline{g}^{(k)t} \left( \sum_{c \in C} \rho''T(d_c^t z^{(k)}) d_c d_c^t \right) \overline{g}^k}, \qquad (8)$$

where $\rho''T(.)$ is the second derivative of $\rho T(.)$. The value of the objective function may increase if the step size is too large. To avoid this potential problem, the value of $\alpha^{(k)}$ is adjusted in an iterative manner, e.g., by dividing by two until the step size is small enough so that the value of the objective function is decreased. This process is described in detail in the following section. At Step S320 the process computes the updated estimate, $\overline{w}^{(k+1)}$, which is expressed as follows:

$$\overline{w}^{(k+1)} = \overline{z}^{(k)} + \alpha^{(k)} \overline{g}^{(k)}. \qquad (9)$$

This is performed by the estimate updator block 320 of FIG. 3A.

Continuing to refer to FIGS. 3A and 3B, at Step S325, a determination is made as to whether the step size is acceptable. This determination is satisfied by the following expression:

$$-\log \Pr(\overline{w}^{(k+1)}) < -\log \Pr(\overline{z}^{(k)}). \qquad (10)$$

That is, equation (10) determines whether the objective value using the current step size is less than the objective value of the previous iteration. In another embodiment, the expression, $-\log \Pr(P_z(\overline{w}^{(k+1)})) < -\log \Pr(\overline{z}^{(k)})$, may be used to determine whether a step size is acceptable. $P_z$ is a projection operator and will be described below. If the step size is too large (i.e., equation (10) is not satisfied), the process proceeds to Step S330 where the step size is reduced, e.g., by the equation $$\alpha^{(k)} = \frac{\alpha^{(k)}}{2}.$$

Then the process jumps back to Step S320. This process may continue until an acceptable step size is obtained (i.e., when equation (10) is satisfied). In the encoder filter 300 of FIG. 3A, these operations are performed by the step size updator 325 and the feedback loop 330. Thereafter, the process proceeds to Step S335 where the step size, $\alpha^{(k)}$, is stored in a buffer 335 of FIG. 3A.

Since the updated estimate $\overline{w}^{(k+1)}$ may fall outside a constraint space Z, at Step S340, $\overline{w}^{(k+1)}$ is projected onto the constraint space Z to give the image estimate at the (k+1)th iteration $$\overline{z}^{(k+1)} = P_z(\overline{w}^{(k+1)}). \quad (11)$$

In projecting the image $\overline{w}^{(k+1)}$ onto the constraint space Z, the point $\overline{z}^{(k+1)} \in Z$ for which $\|\overline{z}^{(k+1)} - \overline{w}^{(k+1)}\|$ is a minimum is found. Both $\overline{w}^{(k+1)}$ and $\overline{z}^{(k+1)}$ are in the image domain while the quantization boundaries (the constraint space Z) are expressed in the transform domain. As part of the projection operator $P_z$, a forward transform is applied to the updated estimate $\overline{w}^{(k+1)}$. Let $Hw^{(k+1)}$ represent the transformed image and let β represent a transform coefficient of $Hw^{(k+1)}$. Moreover, let i represent a quantization cell having boundaries l(i) and h(i), which contains γ, where γ is the projection of β onto the constraint space. The quantization boundaries ($\overline{l},\overline{h}$) were calculated at the initialization Step S305 and provided to the estimate projector 340. If β falls within the range l(i) to h(i), then γ=β (i.e., β is within the constraint space) and no projection is required. However, if β is less than l(i), then γ is equal to l(i). Symmetrically, if β is greater than h(i), then γ is equal to h(i). Once all of the transform coefficients have been projected to the constraint space in the transform domain, $Hw^{(k+1)}$ in essence becomes $Hz^{(k+1)}$. Thereafter, an inverse transform is applied to $Hz^{(k+1)}$ which yields the left side of equation (11) or $\overline{z}^{(k+1)}$. This is performed by the estimate projector 340 of FIG. 3A.

The process proceeds to Step S345 where a determination is made as to whether to perform any more iterations. That is, if $\|\overline{z}^{(k+1)} - \overline{z}^{(k)}\| < \epsilon_{stop}$ or $k+1=k_{max}$, then the process is terminated, where $k_{max}$ is set at a predetermined value during initialization. Typical values for $\epsilon_{stop}$ is 1/1000 of $\|z^{(O)}\|$ and $k_{max}$ ranges between 1 to 10 iterations with 3 being typical. However, it is contemplated that $k_{max}$ may be any positive finite value. If neither of the conditions are true, then the process proceeds to Step S350. At Step S350, k is incremented and the process proceeds back to Step S310. The process performs the Steps S310–S350 until at least one criterion among the criteria specified in Step S345 is met. These steps are performed by the comparator 345 and the feedback loop 350 of FIG. 3A. Once the sequence of step sizes are computed and stored in the buffer 335 of FIG. 3A, they are fed into the bit stream formatter 250 of FIG. 2A. The bit stream formatter 250 formats the sequence of step sizes and the compressed image for storage and/or transmission to the decoder depending on the application. By way of example, for applications such as viewing an image stored on a CD-ROM encyclopedia, the encoded image and the sequence of step sizes are stored on a CDROM. By way of another example, for a two-way video conferencing application, the images or video and the sequence of step sizes are immediately transmitted over a communication medium.

FIG. 4A illustrates an exemplary embodiment of an image decoder 400 that is implemented in the present invention. In one embodiment, the image decoder 400 is implemented in the computer system 100 of FIG. 1 using only one processor $105_1$. However, it is contemplated that the image decoder 400 may be implemented in the computer system 100 of FIG. 1 using a plurality of processors $105_1$–$105_P$. Referring to FIG. 4A, the image decoder 400 includes a bit stream parser 410 which performs error correction, if necessary, and separates the encoded image Y and the sequence of step sizes $\alpha^0, \ldots, \alpha^k$. The encoded image Y is applied to a symbol decoder 420 which performs the symbol decoding (i.e., Huffman, run-length). The sequence of step sizes are transferred to a buffer 460. The buffer 460 may be a separate buffer or contained within the memory 130 of FIG. 1. The quantized image y is then applied to a de-quantizer 430 for de-quantization. The quantization boundaries ($\overline{l},\overline{h}$) are transferred to the buffer 460 for later use by an estimate projector 476. Thereafter, the de-quantized image is applied to an inverse transformer 440 which provides the decoded image, $\overline{z}^{(O)}$. The decoded image is also stored in a buffer 450, typically for temporary storage. In one embodiment, the buffers 450 and 460 are the same buffer. The buffer 450 is coupled to a decoder filter 470. Both the decoded image $\overline{z}^{(O)}$ and the sequence of step sizes are provided to the decoder filter 470 for generating a filtered image $\hat{z}$.

Figure 4B:
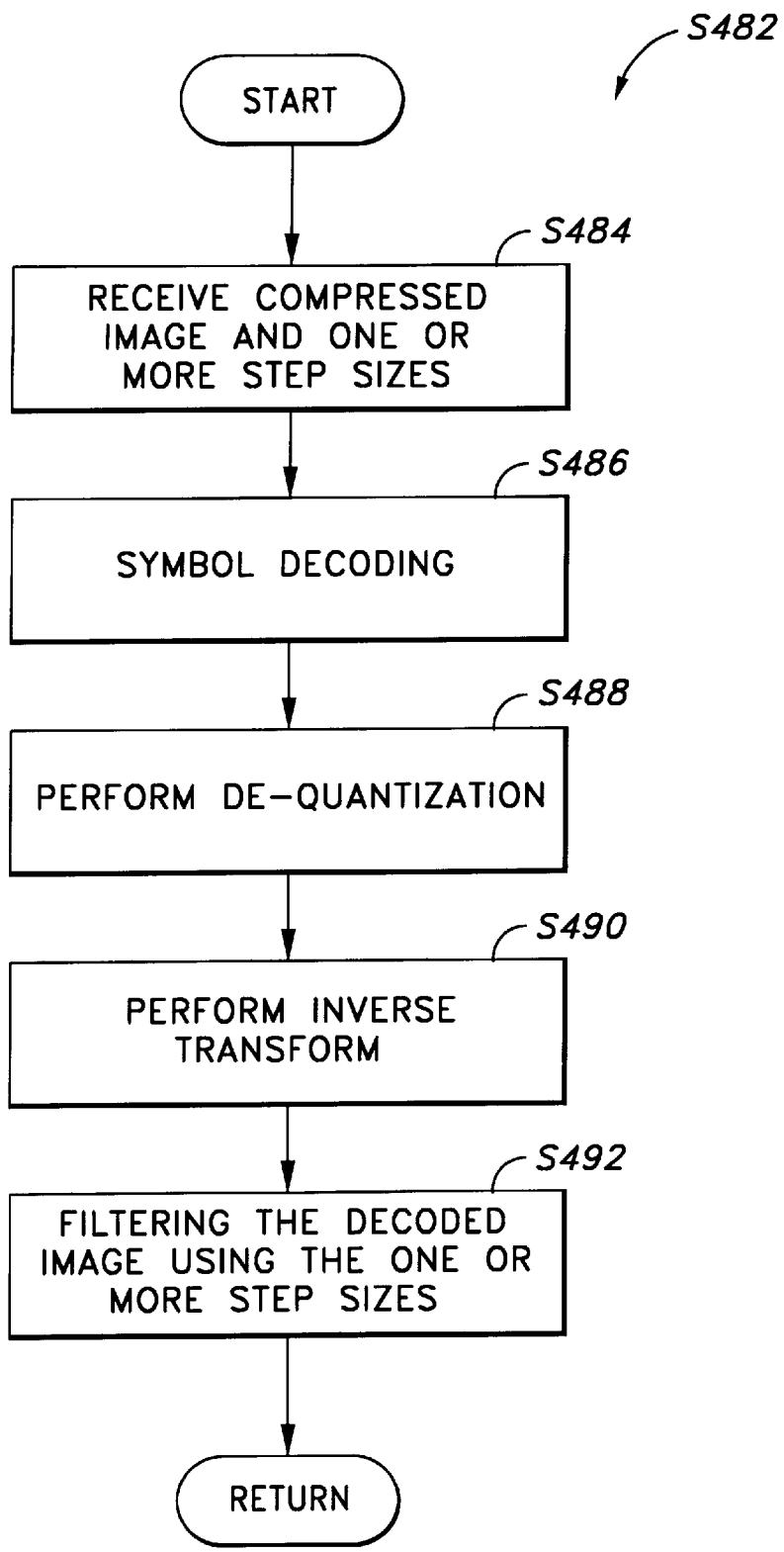
FIG. 4B is a flow diagram illustrating a process for implementing the image decoder of FIG. 4A using a computer system.

FIG. 4B is a flow diagram illustrating a process S482 for implementing the image decoder 400 of FIG. 4A using a computer system such as, for example, the computer system 100 of FIG. 1. In one embodiment, the process S482 is implemented using one or more instructions located in memory (e.g., memory 130 of FIG. 1) and executed by a processor (e.g., processor $105_1$). Referring to FIG. 4B, the process S482 commences with block S484 where the compressed image and the one or more step sizes are received. At block S486, the compressed image is decoded, and, at block S488, the de-quantized. Thereafter, at block S490, the image is inverse transformed to provide a decoded image. AT block S492, the decoded image is filtered using the one or more step sizes to provide a filtered image.

Figure 5:
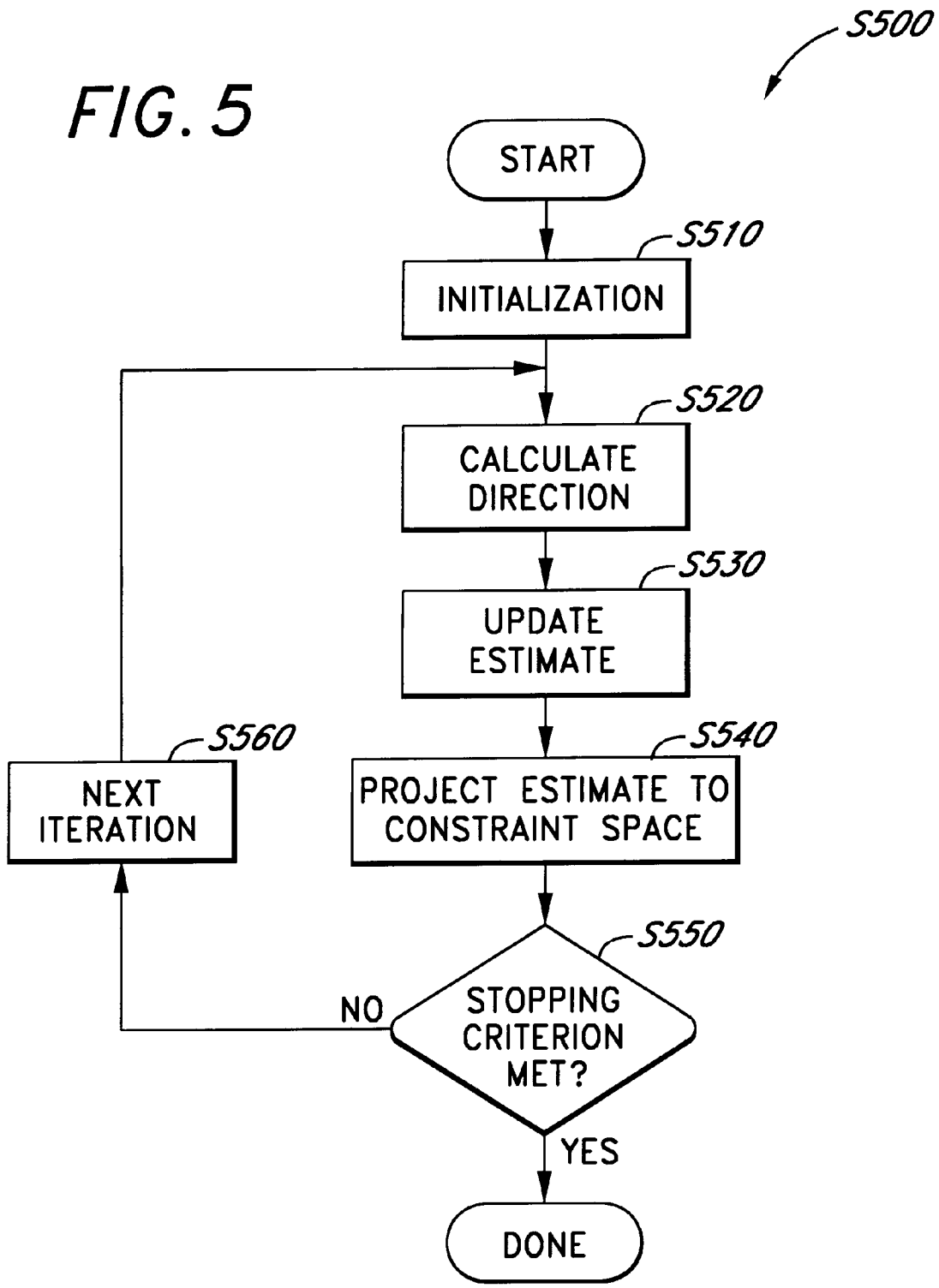
FIG. 5 is a flow diagram illustrating the process steps performed by a decoder filter.

FIG. 5 is a flow diagram illustrating the process steps performed by a decoder filter. The process S500 may be performed in software using the computer system 100 of FIG. 1 or by the decoder filter 470. In one embodiment, the process S500 is implemented using one or more instructions located in memory (e.g., memory 130 of FIG. 1) and executed by a processor (e.g., processor $105_1$). Referring to FIGS. 4A and 5, the process S500 begins at the initialization Step S510, where k is set to zero and $k_{max}$ is set to the number of step sizes. These values may be stored in the buffer 460. At Step S520, the process calculates the gradient, $\overline{g}^{(k)}$, using equation (7) similar to Step 310 of FIG. 3B. This is performed by a direction calculator 472 of FIG. 4A. At Step S530, the process computes the updated estimate, $\overline{w}^{(k+1)}$, using equation (9) similar to Step 320 of FIG. 3B. In the embodiment of FIG. 4A, this is performed by an estimate updator 474. The updated estimate, $\overline{w}^{(k+1)}$, is easily obtained since $\overline{z}^{(k)}$ is known, $\overline{g}^{(k)}$ is calculated at Step S520, and $\alpha^{(k)}$ is transmitted from the image encoder or otherwise provided to the image decoder and temporarily stored within the buffer 460. At Step S540, $w^{(k+1)}$ is projected onto a constraint space Z to give the image estimate at the (k+1)th iteration using equation (11). This Step is identical to Step S340 of FIG. 3B. In the embodiment of FIG. 4A, this is performed by an estimate projector 476.

At Step S550, a determination is made as to whether the stopping criterion is met. That is, whether $k+1=k_{max}$. If k+1≠$k_{max}$, then the process proceeds to Step S560, where k is incremented. The process Steps S520–S560 are performed until k+1=$k_{max}$. In the embodiment of FIG. 4A, this is performed by a comparator 478 and a feedback loop 480. Thus, the process S500 generates a filtered image $\hat{z}$ using $k_{max}$ iterations.

The advantage of the present invention is the removal of the step size calculation apparatus from the decoder. The cost and complexity of operating such an apparatus is significant. Another advantage of the present invention is the removal of the dependencies between the step size and the intermediate filtered image. The step size for a particular iteration is dependent on the intermediate filtered image from the previous iteration. Moreover, the intermediate filtered image from the previous iteration is dependent in turn on the step size for the previous iteration. With the present invention, the step sizes for all iterations are available at the same time. This enables the image decoder to post-process a sub-section of the image with several consecutive iterations for more efficient exploitation of data cache locality in a computer implementation. Since the data cache is relatively small, multiple iterations can be performed on a sub-section of the image without moving the sub-section of the image from the data cache. This is to be distinguished from the prior art where a single iteration must be performed on each sub-section of the image before a second iteration can be performed on any sub-section of the image. As such, this requires sub-sections of the image to be moved in and out of the data cache during each iteration thereby slowing down the decoder.

Figure 6:
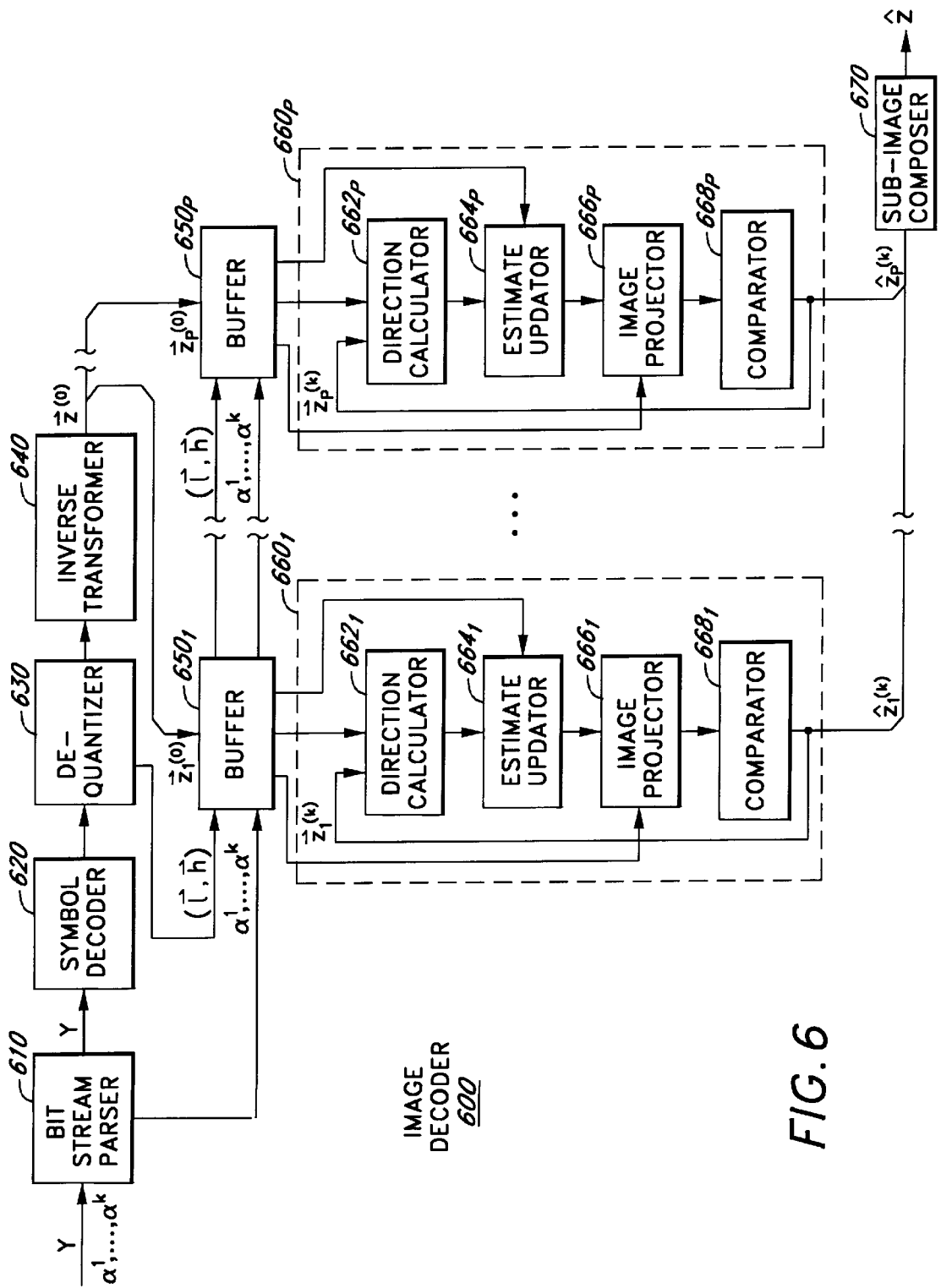
FIG. 6 illustrates another exemplary embodiment of an image decoder that is implemented in the present invention.

FIG. 6 illustrates another exemplary embodiment of an image decoder 600 that is implemented in the present invention. Similar to the image decoder 400 of FIG. 4A, the image decoder 600 includes a bit stream parser 610, a symbol decoder 620, a de-quantizer 630, and an inverse transformer 640. Since all of the step sizes are available at the same time, the present invention can take advantage of post-processing two or more sub-sections of the image simultaneously by using a multi-processor system, such as the one shown in FIG. 1. The decoded image, $\bar{z}^{(0)}$, is broken off into sub-sections $\bar{z}_1^{(0)}, \ldots, \bar{z}_n^{(0)}$ (where n is the number of subsections). The sub-sections, $\bar{z}_1^{(0)}, \ldots, \bar{z}_n^{(0)}$, are simultaneously applied to a plurality of buffers $650_1$–$650_P$ for local storage (typically n>>p). A plurality of the sub-sections $\bar{z}_1^{(0)}, \ldots, \bar{z}_n^{(0)}$ are applied to a plurality of decoder filters $660_1$–$660_P$. The process of each of the decoder filters $660_1$–$660_P$ may be performed by the plurality of microprocessors $105_1$–$105_P$ of FIG. 1. In one embodiment, the operation of each decoder filter $660_1$–$660_P$ is the same as the operation of the decoder filter 470 of FIG. 4A. The output of each decoder filter $660_1$–$660_P$ is a corresponding filtered sub-section of the image $\hat{z}_1^{(k)}, \ldots, \hat{z}_P^{(k)}$. The filtered sub-sections, $\hat{z}_1^{(k)}, \ldots, \hat{z}_P^{(k)}$, are applied to a sub-image composer 670 for merging the sub-sections together and providing a filtered image $\hat{z}$.

By way of an example, given an image size of 640×480 pixels, the image can be split into 4800 sub-sections, each being 8×8. In the computer system 100 of FIG. 1 having 4 processors, the filtered image can be generated about 4 times as fast as a computer system having only one processor. By way of another example, the image can be split into 12 sub-sections each being 160×160.

2. Motion Picture Implementation

The motion picture implementation deals with the compression of a sequence of still images (frames) including audio information. In the discussion that follows, the video encoder and video decoder of the present invention will be discussed without reference to the compression or synchronization of the audio information to the sequence of frames. For encoding purposes, each frame is typically subdivided into N×N pixel regions (e.g., 16×16), hereinafter called blocks. One or more blocks grouped together constitute a macroblock.

Figure 7:
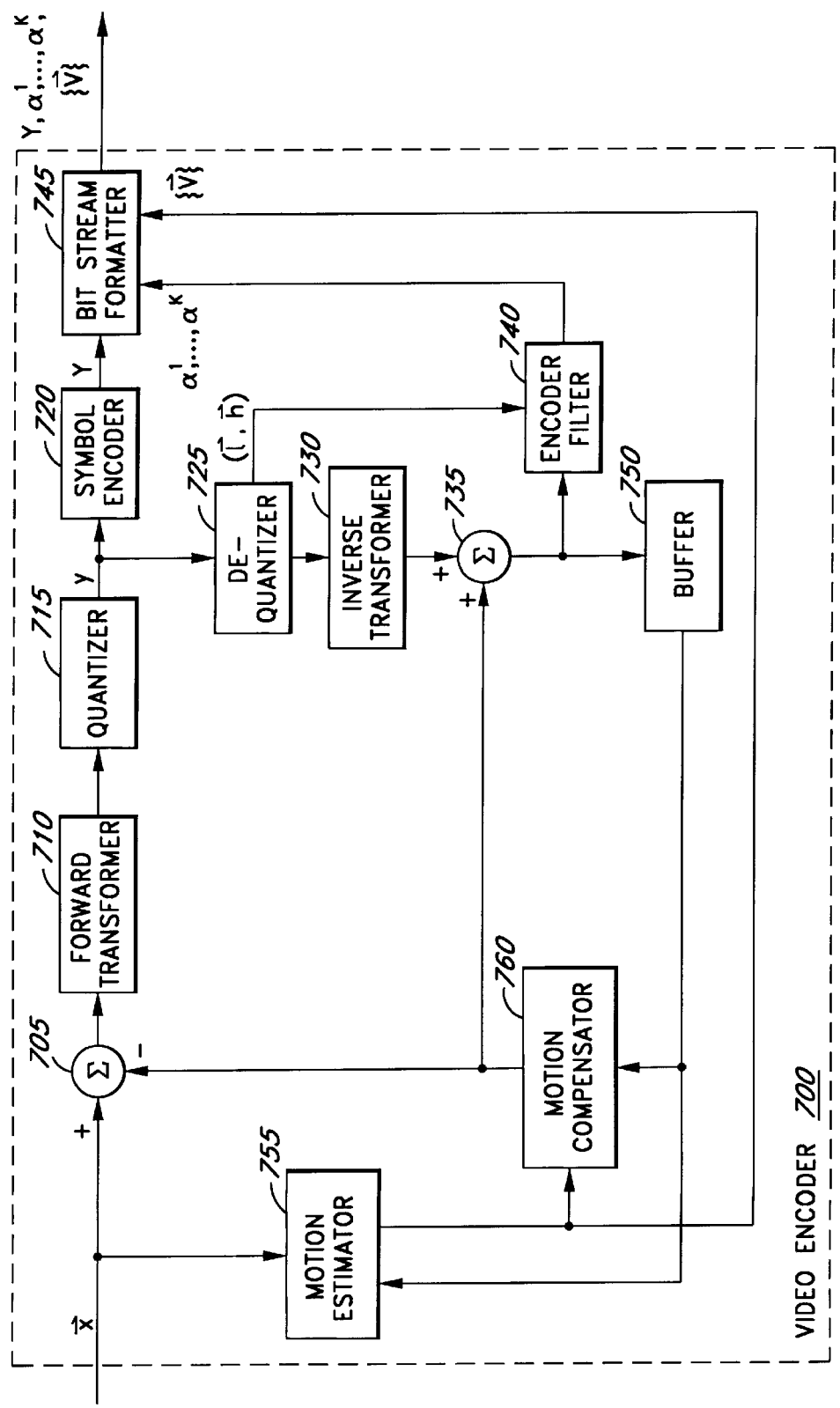
FIG. 7 is a block diagram illustrating an exemplary video encoder utilizing the present invention.

FIG. 7 is a block diagram illustrating an exemplary video encoder 700 utilizing the present invention. If a frame is compressed without reference to neighboring frames in the sequence, it is called an Intra-coded frame. On the other hand, if a frame is compressed with reference to other frames, it is called a Predicted frame. Referring to FIG. 7, a frame $\bar{x}^{(t-1)}$ is applied to a summer 705. Assuming that the frame $\bar{x}^{(t-1)}$ is an Intra-coded frame (e.g., the first frame in the sequence), the compression of the frame $\bar{x}^{(t-1)}$ is similar to the compression of a still image as described by the image encoder 200 of FIG. 2A. That is, blocks 710, 715, 720, and 745 of FIG. 7 correspond to blocks 210, 220, 230, and 250 of FIG. 2A, respectively. Moreover, blocks 725 and 730 correspond to the initial estimator 305 of FIG. 3 and block 740 corresponds to the rest of the blocks in FIG. 3A. Thus, the image decoder 200 of FIG. 2A is a special case of the video encoder of FIG. 700.

Referring back to FIG. 7, the output of the quantizer 715, y, is also applied to a de-quantizer 725 and an inverse transformer 730. The output of inverse transformer 730 is applied to a summer 735. However, since the frame $\bar{x}^{(t-1)}$ is an Intra-coded frame, nothing is added to it at the summer 735. In addition to being applied to the encoder filter 740, the frame $\bar{x}^{(t-1)}$ is also stored in a buffer 750 for use as a reference frame by the video encoder 700 in encoding the next frame in the sequence.

Thereafter, the next frame, hereinafter called the current frame $\bar{x}^{(t-1)}$, is applied to both the summer 705 and a motion estimator 755. For sake of clarity, it is assumed that the current frame $\bar{x}^{(t)}$ is a Predicted frame and it is coded with respect to the reference frame $\bar{x}^{(t-1)}$. The motion estimator 755 also receives the reference frame $\bar{x}^{(t-1)}$ from the buffer 750. The motion estimator 755 estimates the motion displacement of the current frame $\bar{x}^{(t)}$ using information from the reference frame $\bar{x}^{(t-1)}$. Accordingly, the motion estimator 755 generates a motion vector $\{\bar{v}\}$ for each block or macroblock of the current frame. In another embodiment, the motion estimator 755 may use more than one reference frame to produce motion vectors $\{\bar{v}\}$.

The motion vectors $\{\bar{v}\}$ for the current frame are then applied to a motion compensator 760. The motion compensator 760 also receives the reference frame $\bar{x}^{(t-1)}$ from the buffer 750. The motion compensator 760 then combines the reference frame $\bar{x}^{(t-1)}$ and the motion vectors $\{\bar{v}\}$ for the current frame to produce a motion compensation prediction. In another embodiment, the motion compensator 760 may use more than one reference frame to produce a motion compensation prediction. The motion compensation prediction is then applied to the summer 705 and is subtracted from the current frame $\bar{x}^{(t)}$. The output of the summer is a residual frame $\bar{x}_\delta^{(t)}$ (the residual frame represents the difference between the motion compensation prediction and the current frame) which is compressed in the usual fashion of a still image as is described below. All of the motion vectors $\{\bar{v}\}$ for the current frame are also applied to a bit stream formatter 745 for transmission and/or storage.

The residual frame $\bar{x}_\delta^{(t)}$ is then applied to a forward transformer 710 and a quantizer 715. The output of the quantizer 715 is applied to the symbol encoder 720 which typically performs Huffman and/or run-length coding similar to the symbol encoder 230 of FIG. 2A. The output of the symbol encoder 720 is then applied to the bit stream formatter 745. The output of the quantizer 715 is also applied to a dequantizer 725 and an inverse transformer 730. The output of the inverse transformer 730 is a reconstructed residual frame $\bar{x}_\mu^{(t)}$ (the residual frame has some loss due to quantization by the quantizer 715). The reconstructed residual frame $\bar{x}_\mu^{(t)}$ is then added to the motion compensation prediction at the summer 735. The output of the summer 735 is stored in the buffer 750 for use as a reference frame in encoding the next frame in the sequence and so on.

The output of the summer 735 is also applied to an encoder filter 740 for calculating a sequence of step sizes $\alpha^0, \ldots, \alpha^k$ of the current frame $\bar{x}^{(t)}$. The encoder filter 740 is similar to the encoder filter 300 of FIG. 3A with two differences. First, the encoder filter 740 does not include the initial estimator 305 of FIG. 3A because the operation of the initial estimator for the video encoder 700 is performed by the dequantizer 725, the inverse transformer 730, and the summer 735. Second, the estimate projector of the encoder filter 740 is a modified variation of the estimate projector 476 of FIG. 4A. Namely, as part of the projection operation, the motion compensation prediction is subtracted from the image before the forward transform and added back to the image after the inverse transform. The dequantizer 725 provides the quantization boundaries $(\bar{l}, \bar{h})$ to the encoder filter 740. The sequence of step sizes for the current image $\bar{x}^{(t)}$ is calculated by the encoder filter 740 and applied to the bit stream formatter 745. The output of the bit stream formatter 745 for the current frame is the compressed (residual) image Y, the sequence of step sizes $\alpha^0, \ldots, \alpha^k$ and the motion vectors $\{v\}$.

FIG. 8 is a block diagram illustrating an exemplary video decoder 800 utilizing the present invention. Referring to FIG. 8, the video decoder 800 includes a bit stream parser 805 which receives an encoded frame Y, the sequence of step sizes $\alpha^0, \ldots, \alpha^k$, and the motion vectors $\{\bar{v}\}$ (if any) for the encoded frame, performs error correction, and separates the encoded frame, the sequence of step sizes, and the motion vectors (if any). It must be noted that quantization tables used by the quantizer 715 of FIG. 7 may be transmitted in the bit stream or the video encoder 700 of FIG. 7 may transmit a predetermined code for each frame (or block) to the video decoder to specify the quantization table to be used. The encoded frame Y is then applied to a symbol decoder 810, a dequantizer 815, and an inverse transformer 820 (similar to block 420, 430, and 440 of the image decoder 400 of FIG. 4A).

If the frame that is being decoded is an Intra-coded frame, then no motion vectors are transmitted from the video encoder 700 to the video decoder 800. In this case, a motion compensator 830 is not used. The bit stream parser 805 further applies the sequence of step sizes $\alpha^0, \ldots, \alpha^k$ to a decoder filter 835. The decoder filter 835 also receives the decoded frame from the inverse transformer 820 and generates a filtered frame (similar to the decoder filter 470 of FIG. 4A). The output of the decoder filter 835 is also applied to a buffer 840 for use in decoding the next frame.

Conversely, if the frame being decoded is a Predicted frame as in the current frame, then the motion vectors $\{\bar{v}\}$ are applied to the motion compensator 830. The motion compensator 830 also receives the reference frame from the buffer 840. The output of the motion compensator 830 is a motion compensation prediction. The motion compensation prediction is added to the reconstructed residual frame $\bar{x}_\mu^{(t)}$ at a summer 825. The output of the summer 825 is applied to the buffer 840 for the next frame. The output of the summer 825 is also applied to the decoder filter 835, which is similar to the decoder filter 470 of FIG. 4A except that the estimate projector of the decoder filter 835 is the same as the estimate projector of the encoder filter 740. The decoder filter 835 generates a filtered image that is transmitted to a monitor for display (e.g., for a video conference application).

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus, comprising:
   a memory including one or more instructions; and
   a processor coupled to said memory, said processor, in response to the one or more instructions, to
   transform an image to provide a transformed image,
   quantize the transformed image to provide a quantized image,
   produce an image estimate from the quantized image,
   calculate the direction of said image estimate,
   calculate a step size of said image estimate,
   update the image estimate based on said direction and said step size, and adjust the step size until the updated image estimate is within an acceptable range.

2. The apparatus of claim 1 wherein said processor in response to the one or more instructions, further to:
   projecting project said image estimate onto a constraint space, and
   compare said image estimate with a previous image estimate.

3. The apparatus of claim 1 wherein said processor, in response to the one or more instructions, to further compress the quantized image to provide a compressed image, and to transmit the compressed image and the one or more step sizes for subsequent reconstruction of the image in a decoder.

4. The apparatus of claim 1 wherein said processor, in response to the one or more instructions, to further compress the quantized image to provide a compressed image, and to save the compressed image and the one or more step sizes on a computer readable medium.

5. The apparatus of claim 1 wherein said processor, in response to the one or more instructions, to provide the transformed image by performing one a block transform, a slant transform, a Haar transform, and a discrete cosine transform.

6. An encoding apparatus, comprising:
   a forward transformer to receive an image and transform said image into a transformed image;
   a quantizer coupled to the forward transformer, said quantizer to receive said transformed image and provide a quantized image; and
   an encoder filter coupled to the quantizer, said encoder filter to receive said quantized image and iteratively generate one or more step sizes in response to the quantized image, said encoder filter comprising:
   an initial estimator to receive said quantized image and produce an image estimate,
   a direction calculator to calculate the direction of said image estimate,
   a step size calculator to calculate a step size of said image estimate, an estimate updator to update said image estimate based on said direction and said step size, and a step size updator to update said step size of said image estimate until the updated image estimate is within an acceptable range.

7. The encoding apparatus of claim 6 wherein said encoder filter ether includes:

an estimate projector to project said image estimate onto a constraint space.

8. The encoding apparatus of claim 6 wherein said forward transformer performs one of a slant transform, a Haar transform, and a discrete cosine transform.

9. The encoding apparatus of claim 7 wherein said initial estimator includes a de-quantizer and an inverse transformer to produce the image estimate.

10. The encoding apparatus of claim 7 wherein the direction calculator, the step size calculator, the estimate updator, the step size updator, and the estimate projector are iteratively performed until a difference between successive image estimates falls below a predetermined threshold, or a predetermined maximum number of iterations is reached.

11. A method comprising:

transforming an image for providing a transformed image;

quantizing said transformed image for providing a quantized image;

generating one or more step sizes responsive to the quantized image, the generating one or more step sizes comprising:
  decoding said quantized image for providing an image estimate,
  calculating a direction of an objective function of said image estimate,
  calculating a step size of said image estimate, and
  updating said image estimate based on said direction and said step size until the updated image estimate is within an acceptable range.

12. The method of claim 11 wherein generating one or more step sizes further comprises:

projecting said image estimate onto a constraint space; and comparing successive image estimates.

13. The method of claim 11 further comprising storing said quantized image and said one or more step sizes on a computer readable medium.

14. A computer program product, comprising:

a computer usable medium having computer program code embodied therein to encode an image to provide an encoded image;

computer readable program code to iteratively generate one or more step sizes responsive to the encoded image, comprising:
  computer readable program code to produce an image estimate from the quantized image,
  computer readable program code to calculate the direction of said image estimate,
  computer readable program code to calculate a step size of said image estimate,
  computer readable program code to update the image estimate based on said direction and said step size, and
  computer readable program code to adjust the step size until the updated image estimate is within an acceptable range.

15. The computer program product of claim 14 wherein said computer program code to encode said image to provide an encoded image comprises:

computer readable program code to transform an image for providing a transformed image; and computer readable program code to quantize aid transformed image for provided said encoded image.

16. The computer program product of claim 14 wherein the computer readable program code to iteratively generate one or more step sizes further comprises:

computer readable program code to project said image estimate onto a constraint space; and computer readable program code to perform the aforementioned computer readable program code until a difference between successive image estimates is below a predetermined threshold, or a predetermined number of iterations are performed.

* * * * *

UNITED STATES PATENT AND TRADEMARK OFFICE
CERTIFICATE OF CORRECTION

PATENT NO. : 6,226,410 B1  
DATED : May 1, 2001  
INVENTOR(S) : O'Rourke

Page 1 of 1

It is certified that error appears in the above-identified patent and that said Letters Patent is hereby corrected as shown below:

Column 11,
Line 31, delete "{v}", insert -- "{ṽ}",

Signed and Sealed this

Thirteenth Day of August, 2002

Attest:

JAMES E. ROGAN
Attesting Officer
Director of the United States Patent and Trademark Office